United States Patent
Itoh et al.

(10) Patent No.: US 6,726,003 B2
(45) Date of Patent: Apr. 27, 2004

(54) FASTENING STRUCTURE AND MOUNTING STRUCTURE

(75) Inventors: Kazuo Itoh, Kasai (JP); Tomonobu Hasegawa, Hyogo (JP)

(73) Assignee: Itoh Electric Company Limited (JP)

( * ) Notice: Subject to any disclaimer, the term of this patent is extended or adjusted under 35 U.S.C. 154(b) by 0 days.

(21) Appl. No.: 10/217,078

(22) Filed: Aug. 12, 2002

(65) Prior Publication Data

US 2003/0038014 A1 Feb. 27, 2003

(30) Foreign Application Priority Data

Aug. 21, 2001 (JP) ........................................ 2001-250757

(51) Int. Cl.⁷ ............................................. B65G 13/06
(52) U.S. Cl. ....................... 198/788; 193/35 R; 193/37; 198/780; 411/163
(58) Field of Search ................. 193/35 R, 37; 411/160, 161, 162, 163, 164, 125, 126, 399, 533, 119, 120; 198/780, 788

(56) References Cited

U.S. PATENT DOCUMENTS

| 464,301 A | * | 12/1891 | Harvey ......................... 411/158 |
| 2,304,155 A | * | 12/1942 | Dyball ......................... 411/533 |
| 3,610,659 A | * | 10/1971 | Gerarde ........................ 280/169 |
| 4,078,641 A | * | 3/1978 | Payne ........................... 193/37 |
| 4,103,725 A | * | 8/1978 | Abe ............................. 411/160 |
| 4,213,523 A | * | 7/1980 | Frost et al. ..................... 193/37 |
| 4,681,215 A | * | 7/1987 | Martin ......................... 198/843 |
| 5,088,596 A | * | 2/1992 | Agnoff ......................... 198/788 |
| 5,421,441 A | | 6/1995 | Mason |
| 5,533,852 A | * | 7/1996 | Matthews ..................... 411/534 |
| 5,967,721 A | * | 10/1999 | Giachinta et al. ............... 411/7 |
| 6,076,647 A | * | 6/2000 | Agnoff ......................... 193/37 |
| 6,131,717 A | * | 10/2000 | Owen ......................... 193/35 A |
| 6,244,427 B1 | * | 6/2001 | Syverson ..................... 198/788 |

FOREIGN PATENT DOCUMENTS

JP    11 268815    10/1999

* cited by examiner

*Primary Examiner*—Richard Ridley
(74) *Attorney, Agent, or Firm*—Wood, Phillips, Katz, Clark & Mortimer

(57) ABSTRACT

A shaft 6 of a motorized roller 1 is fastened to a side wall 17a of a frame 17 through a plate 19. An engaging portion 14 of the shaft 6 is fitted into a hole 21 of the plate 19 so as to prevent rotation of the shaft 6 relative to the plate 19. As a nut 22 tightened on a threaded portion 15 of the shaft 6 presses and urges the plate 19 against the side wall 17a, teeth 20 formed at the corners of the plate 19 bite into the surface of the side wall 17a and prevents rotation of the plate 19 relative to the side wall. Thus the shafts 6, 7 are fastened unrotatably relative to the side wall 17a.

6 Claims, 10 Drawing Sheets

FASTENING STRUCTURE AND MOUNTING STRUCTURE

BACKGROUND OF THE INVENTION

1. Field of the Invention

The present invention relates to a fastening structure for fastening a shaft and a mounting structure for mounting a roller unit having a shaft to a fixed body such as a conveyor frame, which is fixed to the floor or the ground.

2. Description of Related Art

Some conventional type of roller conveyor has a plurality of motorized rollers arranged on a frame. Each of the motorized rollers is constructed by accommodating a motor and a reducer in a roller body supported rotatably relative to a shaft that is fastened to a fixed body such as the frame.

Conventional fasteners, including a shaft fastener disclosed in Japanese Laid-open Patent Application No. Hei. 11-268815 and a mounting plate 52 shown in FIG. 10 of the drawings attached hereto, have been used in order to fasten shafts of motorized rollers to fixed bodies such as frames. A shaft 51 of a conventional motorized roller 50 is fastened to a frame 53 (a fixed body) of a conveyor through a mounting plate 52, as shown in FIG. 10. Each end of the motorized roller 50 has a shaft 51 protruding therefrom. The outer surface of the shaft 51 is threaded. The plate 52 has a throughhole 54 at substantially its center. The shaft 51 is able to be fitted into the hole 54. The plate has four throughholes 55 at the four corners. The holes are used in mounting the plate 52 to the frame 53. The frame 53 has throughholes 56 into which the shaft 51 of the motorized roller 50 can be inserted and four threaded holes (not shown) around the throughhole 56.

The plate 52 is mounted to the frame 53 through screws 57, aligning the hole 54 with the hole 56 and aligning the holes 55 with the threaded holes respectively. The shaft 51 is inserted into the hole 56 of the frame 53 and into the hole 54 of the plate 52. The shaft 51 is fastened to the frame by tightening a nut 58. The shaft 51 cannot rotate relative to the frame 52 because the hole 54 of the plate 52 is in conformity with the shaft 51.

The above-described conventional mounting of the shaft 51 involves mounting of the plate 52 to the frame 53 via screws 57 so as to prevent rotation of the shaft 51. For mounting and fastening the shaft 51 to the frame, a throughhole 56 to accommodate the shaft 51 should be drilled on the frame 53 and threaded holes, not shown, in which the screws are driven, should be formed around the hole 56 on the frame 53. Thus the mounting and fastening of the shaft 51 takes a lot of time and effort and is inefficient. If the frame 53 is of complex shape, such as channel-shape or square U-shape in section shown in FIG. 10, the mounting and fastening becomes more troublesome. Thus the conventional fastening structure in which the plate 52 is preliminarily screwed on the frame 53 makes a rigid limitation on the shape of the frame 53, which is the fixed body.

Therefore, it is an object of the invention to provide a fastening structure of a shaft and a mounting structure of a roller unit having simple construction that is capable of fastening the shaft to any shape of fixed body easily and quickly. Other objects, advantages, features, and uses will become more apparent as the description proceeds, when considered with the accompanying drawings.

SUMMARY OF THE INVENTION

In one aspect of the invention to solve the above-described problem, a fastening structure including a fixed body and a shaft for fastening the shaft to the fixed body further includes a plate mountable on the shaft unrotatably relative to the shaft and having projections engageable with a surface of the fixed body and a fastener mountable on the shaft so as to urge the projections against the surface to prevent rotation of the plate relative to the fixed body about the axis of the shaft.

In this specification, a projection may be in any shape if it can prevent the rotation. It may be a tooth, a fluke, a pin, or a nail.

As the plate of the fastening structure has projections that engage with or bite into the surface of the fixed body, the plate need not be screwed so as to prevent rotation. Therefore, only one throughhole, through which the shaft extends, should be formed on the fixed body to fasten one shaft, without the need of forming throughholes in which the screws are driven. Therefore, easy and rapid fastening of a shaft to a fixed body is achieved.

As the plate is mounted on the shaft unrotatably relative to the shaft and is not rotatable relative to the fixed body about the axis of the shaft either, the shaft is fastened to the fixed body unrotatably relative to the body.

In another aspect of the invention, a fastening structure including a fixed body and a shaft for fastening the shaft to the fixed body further includes a plate mountable on the shaft unrotatably relative to the shaft and having projections engageable with a surface of the fixed body and a fastener mountable on the shaft so as to urge the projections against the surface to prevent rotation of the plate relative to the fixed body about the axis of the shaft, wherein the shaft includes an engaging portion and a supporting portion that is larger than the engaging portion in diameter, wherein the plate has a throughhole into which the engaging portion is fittable so as to prevent rotation of the plate relative to the shaft, and wherein the fixed body and the plate are sandwiched between the supporting portion and the fastener.

In the fastening structure, as the plate has projections engageable with a surface of the fixed body, the plate does not need to be screwed to prevent its rotation. Fastening work of the shaft is simplified and working efficiency is enhanced as threaded holes on the fixed body, which were necessary in conventional fastening structure, are not to be formed.

As the plate is mounted on the shaft unrotatably relative to the shaft and is not rotatable relative to the fixed body about the axis of the shaft either, the shaft is fastened to the fixed body unrotatably relative to each other.

In this specification, "a supporting portion that is larger than the engaging portion in diameter" means that the circumcircle of the supporting portion is larger in diameter than the circumcircle of the engaging portion. The section of the supporting portion may be of any shape such as rectangular and polygonal shape.

In still another aspect of the invention, a mounting structure including a roller unit, a shaft, a plate, a fixed body, and a fastener for mounting the roller unit to the fixed body, wherein the plate is mountable on the shaft unrotatably relative to the shaft and having projections engageable with a surface of a fixed body, wherein the roller unit has a roller body mounted on the shaft rotatably relative to the shaft and driven by a motor housed in the roller body, wherein the fastener is mounted on the shaft so as to urge the projections against the surface to prevent rotation of the plate relative to the fixed body about the axis of the shaft.

In the mounting structure of a roller unit, the plate does not need to be screwed to prevent its rotation, as the plate has projections engageable with a surface of the fixed body. As threaded holes on the fixed body, which were necessary in conventional fastening structure, are not to be formed, only one throughhole should be formed on the body to fasten one shaft. Thus the shaft of a roller unit can be fastened to the fixed body easily and rapidly.

As the plate is mounted on the shaft of the roller unit unrotatably relative to the shaft and is not rotatable relative to the fixed body about the axis of the shaft either, the shaft of the roller unit is fastened to the fixed body unrotatably relative to the body.

In the fastening structure or the mounting structure, the plate has a throughhole, the shaft includes an engaging portion and a supporting portion that is larger than the engaging portion in diameter, and the engaging portion is fittable into the throughhole so as to prevent rotation of the plate relative to the shaft.

As stated above, "a supporting portion that is larger than the engaging portion in diameter" means that the circumcircle of the supporting portion is larger in diameter than the circumcircle of the engaging portion. The section of the supporting portion may be of any shape such as rectangular and polygonal shape.

In the fastening structure or the mounting structure, the plate may be sandwiched between the fastener and the fixed body.

By the arrangement, as the plate is unrotatable relative to the fixed body and is mounted on the shaft unrotatably relative to the shaft either, the shaft is fastened to the fixed body unrotatably relative to the body.

If the shaft includes an engaging portion and a supporting portion that is larger than the engaging portion in diameter, the plate may be sandwiched between the supporting portion and the fixed body.

By the arrangement, as the projections engage with the surface of the fixed body, the plate is unrotatable relative to the fixed body. As the plate is mounted on the shaft unrotatably relative to the shaft either, the shaft is fastened to the fixed body unrotatably relative to the body.

By the arrangement also, rotational and vibrational forces acting on the shaft is transmitted to the fixed body and dissipated into the fixed body. Thus rotation of the plate relative to the fixed body is firmly prevented.

In the fastening structure or the mounting structure, preferably the plate is substantially rectangular with the projections at its four corners and with a throughhole at substantially its center. More preferably, each corner has the same number of projection or projections. Each corner may have one projection.

By the arrangement, rotational force acting on the plate about the axis of the shaft is distibuted to all the projections substantially evenly, firmly preventing rotation of the plate relative to the fixed body.

In the fastening structure or the mounting structure, preferably each of the projections has a sharp tip. In other words, each of the projections is preferably in the form of a tooth, a fluke, a pin or a nail.

By the arrangement, the projections engage with or bite into the fixed body firmly. Thus the plate is fastened to the fixed body firmly.

In the fastening structure or the mounting structure, the plate may have a throughhole into which the shaft is fittable, the plate may further have tabs around the throughhole, and each of the tabs may be deformable into a form in conformity with the shaft as the fastener is mounted on the shaft.

By the arrangement, rotation of the shaft relative to the plate is firmly prevented as each of the tabs deforms into a form in conformity with the shaft as the fastener is mounted on the shaft.

In the fastening structure or the mounting structure, the plate may have a noncircular throughhole, the shaft may have a portion that is noncircular in section and capable of being inscribed in the throughhole, the portion may extend over at least partial length of the shaft, and the portion may be fittable into the throughhole. The throughhole of the plate is noncircular as seen from the direction normal to the surface of the plate.

The sectional shape of the portion is not necessary identical with the shape of the hole. It is all right if the shapes prevent rotation of the shaft relative to the plate.

Even if the shaft in the structure receives a rotational force about the axis of the shaft, the shaft cannot rotate because it contacts the through-hole of the plate.

BRIEF DESCRIPTION OF THE DRAWINGS

FIG. 2(*b*) is a sectional view taken along line A—A of FIG. 2(*a*);

FIG. 6(*b*) is a sectional view taken along line B—B of FIG. 6(*a*);

FIG. 7(*b*) is a sectional view taken along line C—C of FIG. 7(*a*);

FIG. 7(*c*) is a perspective view of the plate in FIG. 7(*a*);

FIG. 8(*b*) is also a partially sectional view showing the mounting plate in the embodiment;

FIG. 9(*b*) is a sectional view taken along line D—D of FIG. 9(*a*); and

DESCRIPTION OF THE PREFERRED EMBODIMENTS

Now some preferred embodiments of the present invention will be described referring to the accompanying drawings.

Figure 3:
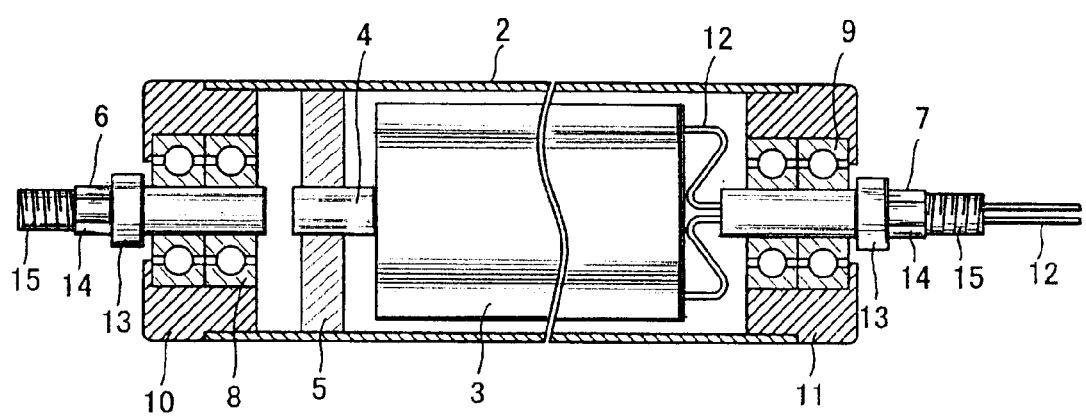
FIG. 3 is a partially sectional view of a motorized roller used in the embodiment.

As shown in FIG. 3, a motorized roller 1 incorporates a geared motor 3 (geared motor unit) within a roller body 2. The geared motor 3 incorporates a motor and a reducer, which are not shown. Rotational force of a motor incorporated in the geared motor 3 is transmitted via a reducer to an outputting shaft 4 protruding from an end of the geared motor 3. The outputting shaft 4 is connected to a cylindrical connector 5 which is in turn fixed to the inner surface of the roller body 2.

The rotational force transmitted to the shaft 4 is then transmitted via the connector 5 to the roller body 2, rotating the body 2. The roller body 2 accommodates several electric devices such as a magnetic detector and a temperature sensor, which are not shown.

Each of the axial ends of the roller body 2 has a shaft 6, 7 protruding therefrom. The shafts 6, 7 are supported in the roller body 2 and by bearings 8, 9 rotatably relative to lid members 10, 11 that are housed in and fixed to the roller body 2. The shaft 7 is a cylindrical body, through which lead wires 12, which are connected to the motor incorporated in the geared motor 3 and the electric devices such as the magnetic detector and the temperature sensor, run to the outside of the roller body 2.

Each of the shafts 6, 7 protruding from the roller body 2 has a supporting portion 13, an engaging portion 14 and a threaded portion 15. All these portions are formed concentric. The supporting portion 13 has a larger diameter than the engaging portion 14, which in turn has a larger diameter than the threaded portion 15. The engaging portion 14 is hexagonal in section. The threaded portion 15 is on the axially outer side of the engaging portion 14 and is threaded on its outer circumference.

Figure 1:
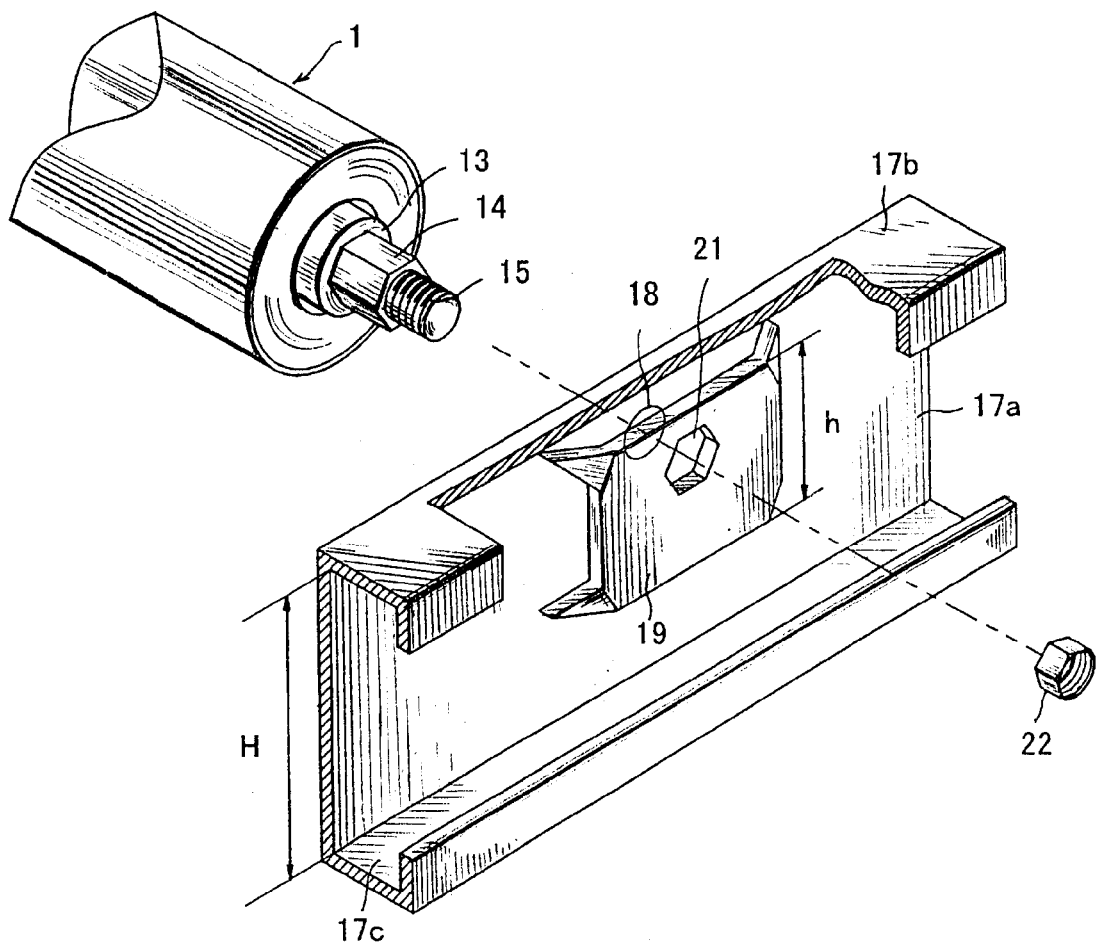
FIG. 1 is an exploded perspective view of an embodiment of the invention.
Figure 2:
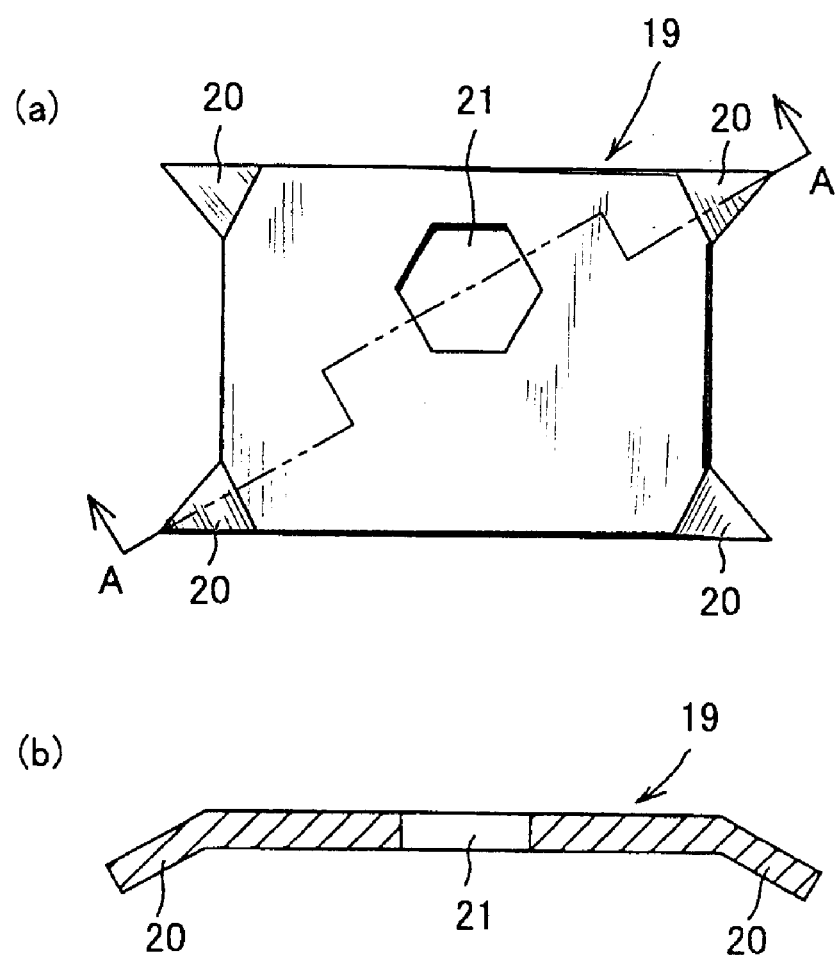
FIG. 2(*a*) is a front view of a mounting plate in the embodiment.

As shown in FIG. 1, a frame 17, functioning as a fixed body to which the shaft 6 or 7 is fastened, is a steel product having a square C-shape in section. The frame 17 has a vertical side wall 17a that is engageable with the shaft 6, 7, an upper wall 17b projecting horizontally from the uppermost end of the side wall 17a, and a lower wall 17c projecting horizontally from the lowermost end of the side wall 17a. The frame 17 has a height H, which is a distance between the upper wall 17b and the lower wall 17c. A plurality of throughholes 18 that are large enough for the shaft 6, 7 to extend through are formed longitudinally at a height slightly higher than H/2 on the side wall 17a. More specifically, the diameter of each hole 18 is larger than that of the threaded portion 15 and smaller than that of the supporting portion 13. The diameter of each hole 18 is substantially equal to or slightly larger than the diameter of the circumcircle of the engaging portion 14.

When the shaft 6 or 7 is inserted into the hole 18, the engaging portion 14 extends through the hole and the end face of the supporting portion 13 abuts to the side wall 17a. Thus vibrational or rotational forces acting on the shaft 6, 7 is transmitted to the frame 17 and dispersed in the frame. As the diameter of the circumcircle is substantially equal to the diameter of the hole 18, load acting on the motorized roller 1 is supported by the hole 18. Between a pair of the frames 17, motorized rollers 1 incorporating geared motors 3 and free rollers (not shown), which have no driving source in themselves, are arranged to form a ladder-shape, with shafts 6, 7 fastened to the side walls 17a.

The plate 19 is made of a hard steel that is harder than the material of the frame 17. More specifically, the plate 19 is made of carbon steel (SK-5) that is hardened by quench hardening. The Rockwell hardness of the plate 19 is 55 to 60 HRC, which is harder than the frame 17. The plate 19 has a substantially rectangular plate body 30 and projections or teeth 20 which are formed by bending the four corners of the plate body to a direction. The teeth are triangles as seen from the front that are long in the direction of the length of the plate body 30. Each of the tips 31 of the teeth 20 has an acute angle θ of about 10 to 13 degrees.

The length h of the shorter sides of the plate body 30 is smaller than the height H of the frame 17. The plate body 30 has a throughhole 21 at substantially its center. The throughhole 21 has a hexagonal shape which is substantially the same that the section of the engaging portion 14 has. The size of the hole 21 is in conformity with the size of the engaging portion 14 so that a rotation of the engaging portion 14 relative to the plate 19 is prevented by the hole 21.

Figure 4:
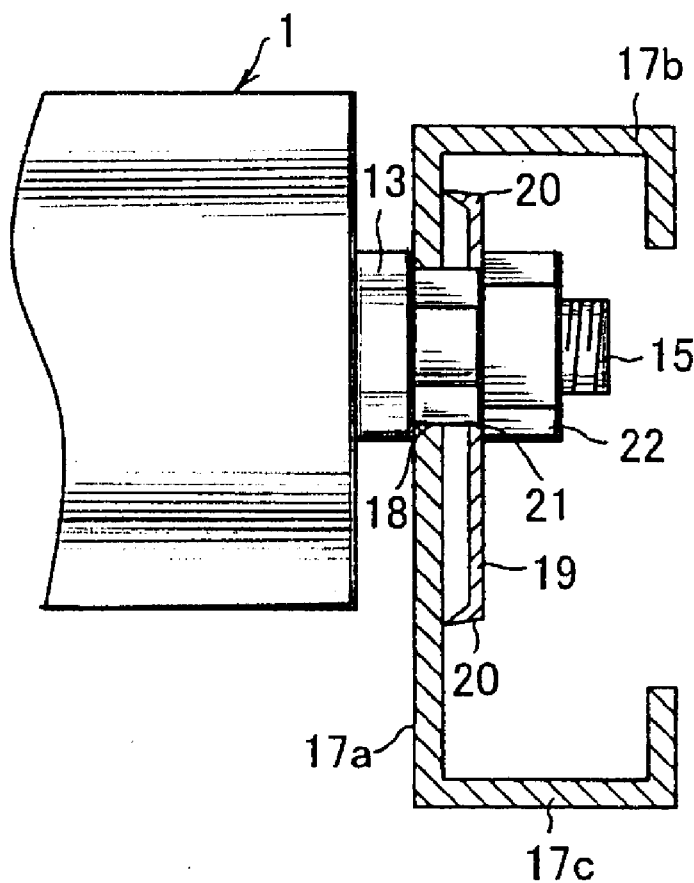
FIG. 4 is a side view partly in section of the embodiment.

As shown in FIG. 4, the shafts 6, 7 of the motorized roller 1 are fastened to the side walls 17a via a plate 19 with the end face of the supporting portion 13 abutting to the inner surface, which is the left side in the figure, of the side wall 17a. On the outer side, which is the right side in the figure, of the side wall 17a, the plate 19 is positioned with the teeth 20 projecting to the side wall 17a. The engaging portion 14 is fitted into the throughhole 21 of the plate 19 so as to prevent rotation of the shaft 6, 7 relative to the plate 19. A nut 22, functioning as a fastener, is mounted on the threaded portion 15 so as to press or urge the plate 19 against the side wall 17a of the frame 17. When the plate 19 is pressed against the side wall 17a, the tips 31 of the teeth 20 bite into the surface of the side wall 17a, as the tips 31 has an acute angle θ, so that rotation of plate 19 relative to the side wall 17a is prevented by the teeth 20. Thus the shafts 6, 7 is fastened unrotatable relative to the side wall 17a of the frame 17.

In this embodiment, the plate 19 is formed by making a throughhole 21 at substantially the center of the plate body 30 and forming teeth 20 at the four corners of the plate body 30. A rotational force acting on the plate 19 about the axis of the shaft 6, 7 is distributed and transmitted to all the teeth 20 substantially evenly, dissipated into the frame 17 via tips 31 and relieved. Thus rotation of the plate 19 relative to the frame 17 is firmly prevented.

As the rotational force acting on the plate 19 is dissipated into the frame 17 via tips 31, little or nothing of the rotational force can be transmitted to the nut 22 mounted on the shaft 6, 7. Thus, the above-described arrangement surely protect the nut 22 from loosening by the rotational force acting about the axis of the shaft 6, 7.

Figure 5:
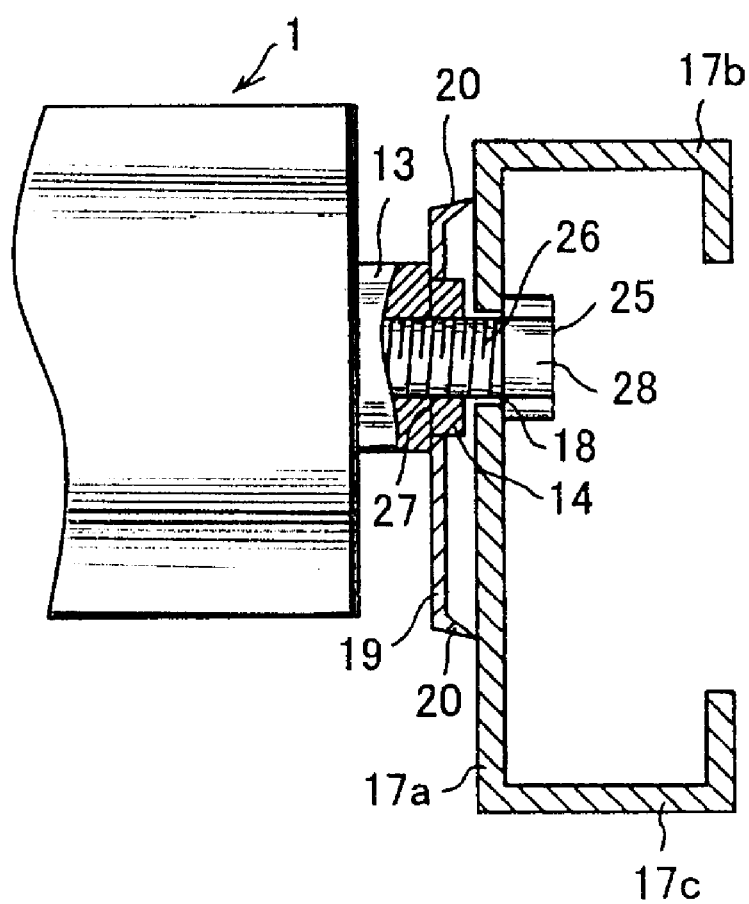
FIG. 5 is a fragmentary side view partly in section of another embodiment.

In another embodiment, shafts 6, 7 may be fastened through the plate 19 disposed inside of the side wall 17a (the left side in the figure), as shown in FIG. 5. The shaft 6 or 7 in this embodiment has a supporting portion 13 and an engaging portion 14. A threaded bore 27 for fastening a bolt 25, which functions as a fastener, is formed axially in each of the shafts 6, 7. A shaft or shank 26 of a bolt 25 is capable of being screwed axially into the bore 27 from the engaging portion side. The bolt 25 is fastened to the engaging portion 14 by being screwed from outside of the side wall 17a through the hole 18 into the threaded bore 27, thus the supporting portion 13 presses or urges the plate 19 against the side wall 17a. As the engaging portion 14 of the shaft 6, 7 is fitted into the hole 21 of the plate 19, the shaft 6, 7 is unrotatable relative to the plate 19.

The supporting portion 13 abuts to a surface of the plate 19. The surface is on the other side of the teeth 20. The teeth 20 of the plate 19 bite into the inner surface of the side wall 17a. The shank 26 of the bolt 25 extends through the hole 18 of the frame 17 from outside of the side wall 17a. The bolt head 28 of the bolt 25 abuts to the outer surface of the side wall 17a. The shaft 6, 7 is prevented from rotation relative to the plate 19, and the plate 19 is in turn not rotatable relative to the side wall 17a as the teeth 20 bite into the side wall 17a. Thus the shaft 6, 7 is fastened unrotatably relative to the side wall 17a.

As described above, the plate 19 is fastened to the frame 17, being incapable of relative rotation, dispensing with screws. Thus, the invention enables the fastening of the shafts 6, 7 to the frame 17 by only making a throughhole 18 at a predetermined position on the frame and makes the mounting of the shafts 6, 7 easier and faster.

As the plate 19 is unrotatable relative to the frame 17 and the shafts 6, 7 are unrotatable relative to the plate 19, the shafts 6, 7 are fastened unrotatably relative to the frame 17.

Figure 6:
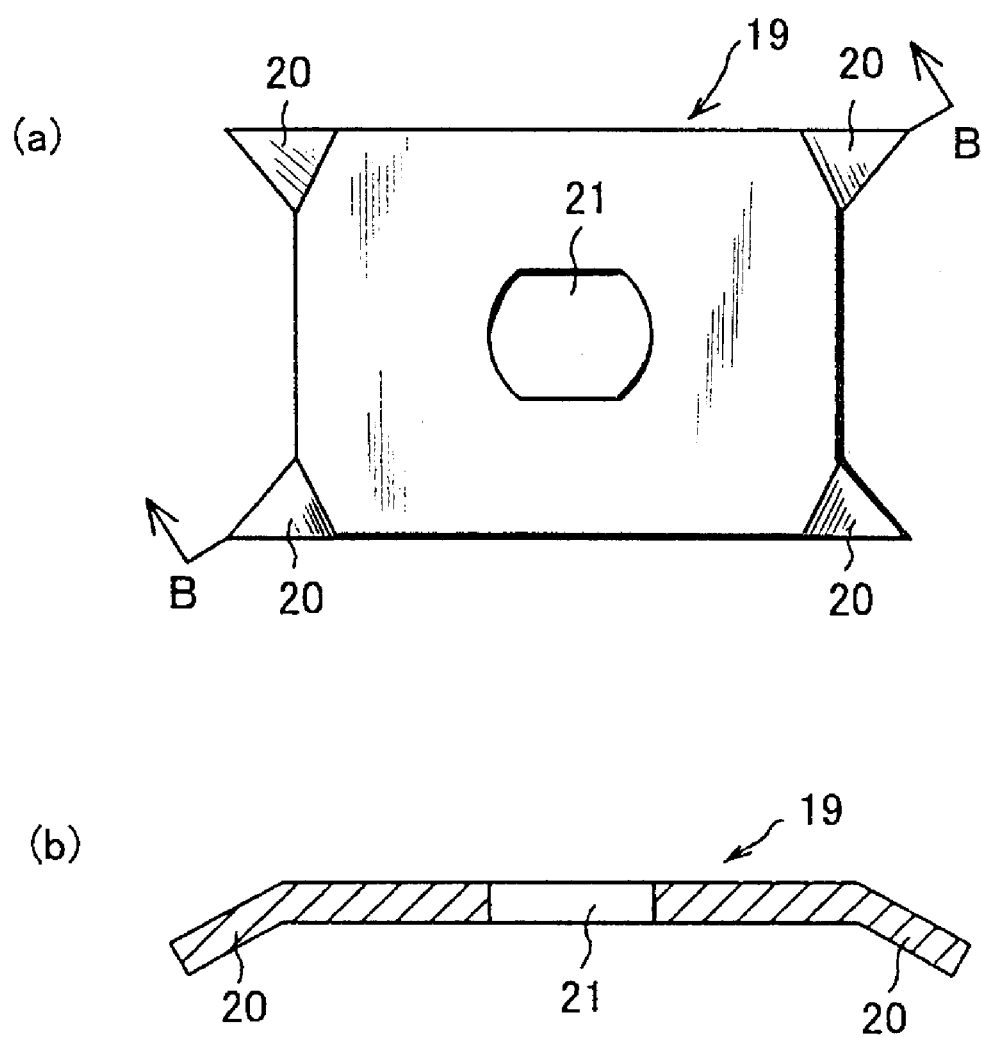
FIG. 6(*a*) is a front view of a modified form of the plate shown in FIG. 2(*a*) and FIG. 2(*b*)

The shape of the throughhole 21 of the plate 19 can be modified in conformity with the shape of the section of the shaft 6, 7, as shown in FIG. 6(a). Preferably the hole 21 has substantially the same shape and size that the section of the engaging portion 14 has, in order to prevent rotation of the shaft 6, 7 relative to the plate 19 more firmly. However, the throughhole 21 may have any shape if the shaft 6, 7 is prevented from rotation relative to the plate 19 when a rotational force acts on the shaft 6, 7.

Figure 7:
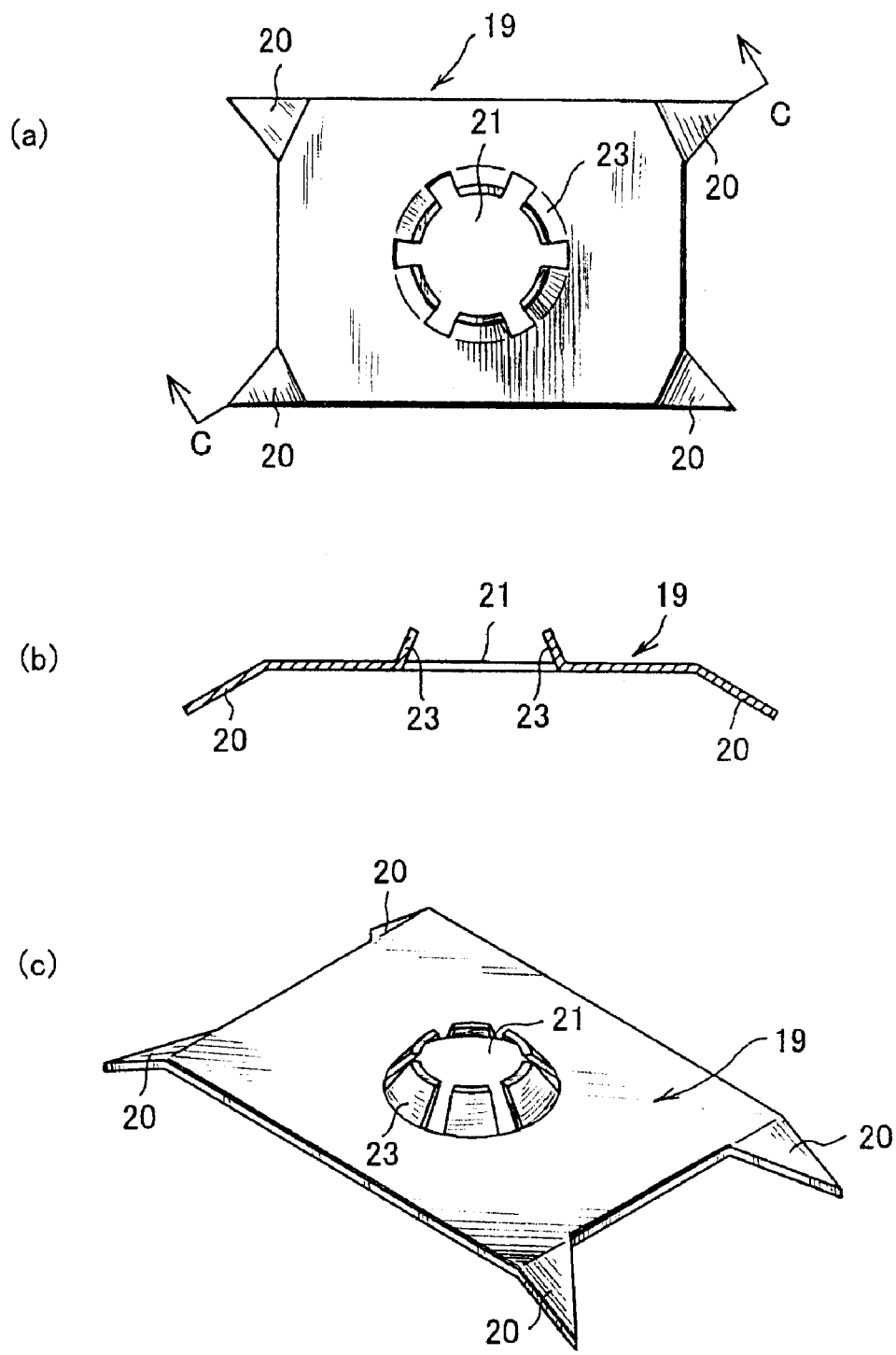
FIG. 7(*a*) is a front view of another modified form of the plate shown in FIG. 2(*a*) and FIG. 2(*b*)
Figure 8:
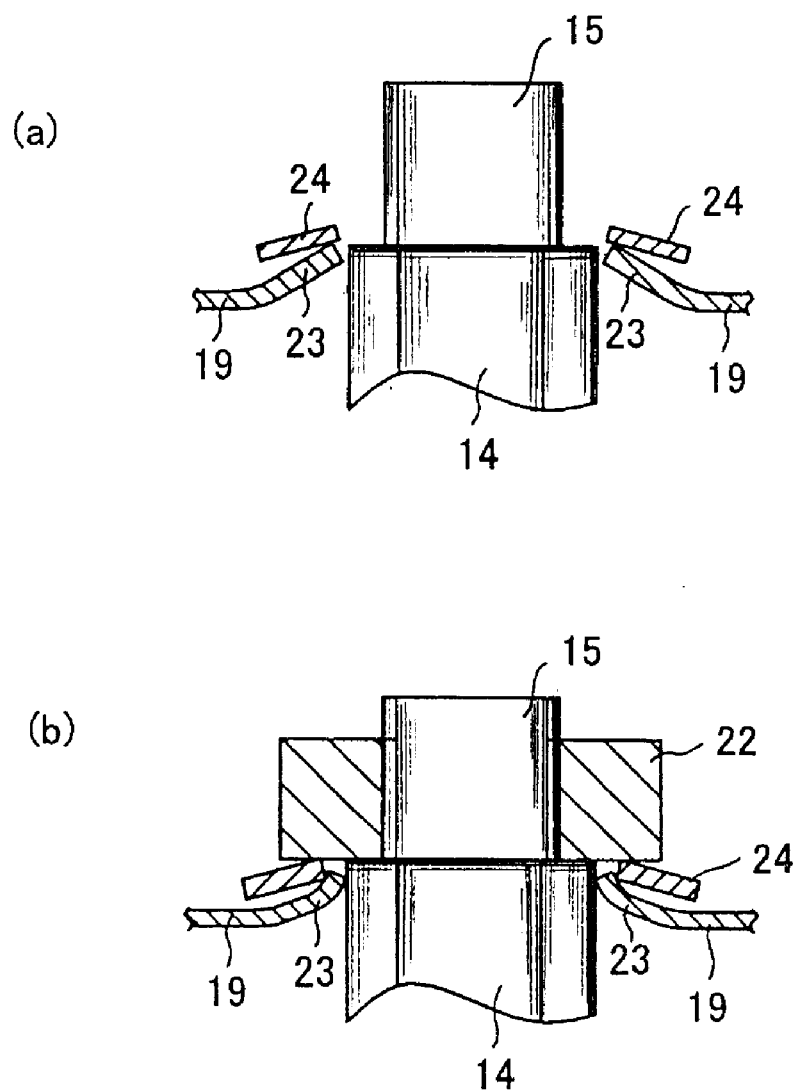
FIG. 8(*a*) is a partially sectional view showing a mounting plate in the embodiment shown in FIG. 7(*a*)

In a further embodiment, the plate 19 may have trapezoidal tabs 23 formed around the throughhole 21 by burring, as shown in FIGS. 7(a), 7(b) and 7(c). If the shaft 6 or 7 is fitted in the throughhole 21 of the plate 19, a tapered washer 24 is mounted on the tabs 24, and the nut 22 is mounted on the shaft 6, 7, as shown in FIG. 8(a), the tapered washer 24 shifts toward the plate 19, pressing the tabs 23, which are deformed into shapes in conformity with the engaging portion of the shaft 6, 7, and prevents rotation of the shaft 6, 7 relative to the plate 19 without fault. As the tabs 23 are deformed into shapes in conformity with the engaging portion 14, rotation of the shaft 6, 7 relative to the plate 19 is prevented without fault, regardless of the shape of the shaft 6, 7.

Figure 9:
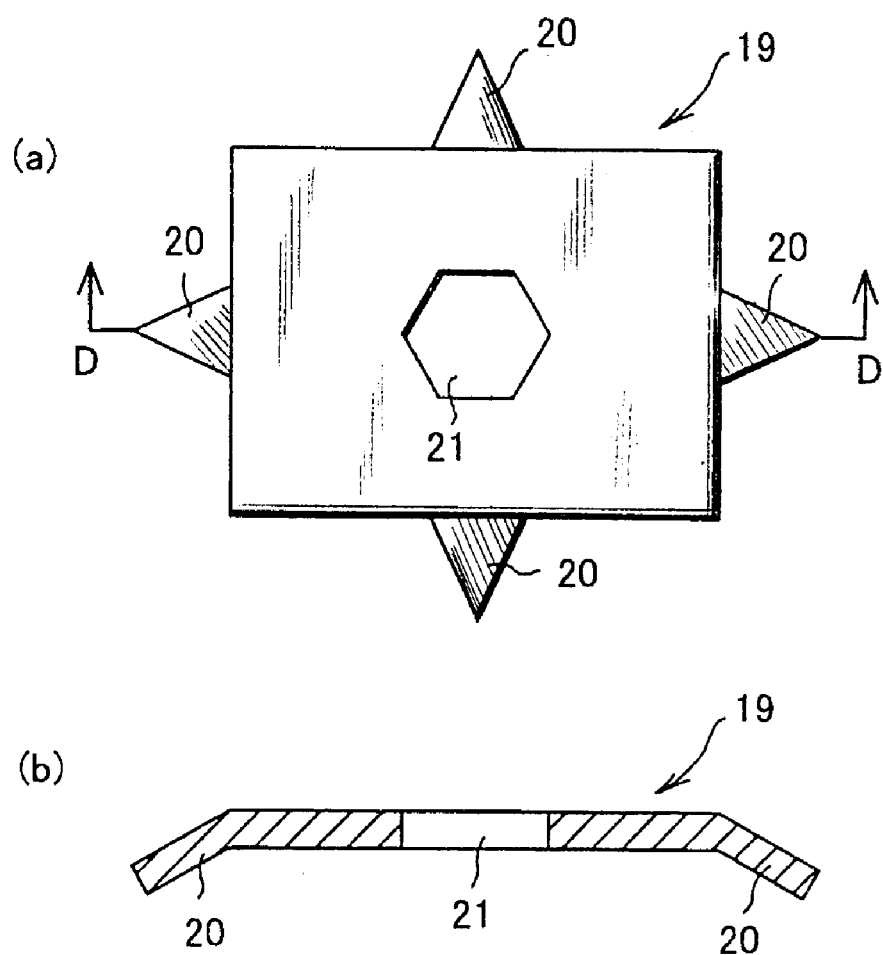
FIG. 9(*a*) is a front view of still another modified form of the plate shown in FIG. 2(*a*) and FIG. 2(*b*)

Alternatively, teeth 20 may be formed at any cite, e.g. on the periphery, of the plate 19, as shown in FIGS. 9(a) and 9(b). The plate 19 may be formed by bending the four corners of a substantially rectangular steel plate. Alternatively, the plate 19 may be formed by bending the four corners of a nealy rectangular steel plate that has four projections, which transform into the teeth, at the four corners. The plate may be made of suitable solid material. For example, it may be made by bending a plate made of metal such as aluminum and copper or by molding a plastic.

Though the teeth 20 of the plate 19 in the above-mentioned embodiment have tips 31 with an angle θ of 10 to 13 degrees, the angle θ of the tips is not limited in the range. Preferably the angle θ is an acute angle. It is more preferably within the range from 5 to 60 degrees, further more preferably within the range from 5 to 30 degrees, and most preferably within the range from 10 to 13 degrees.

Figure 10:
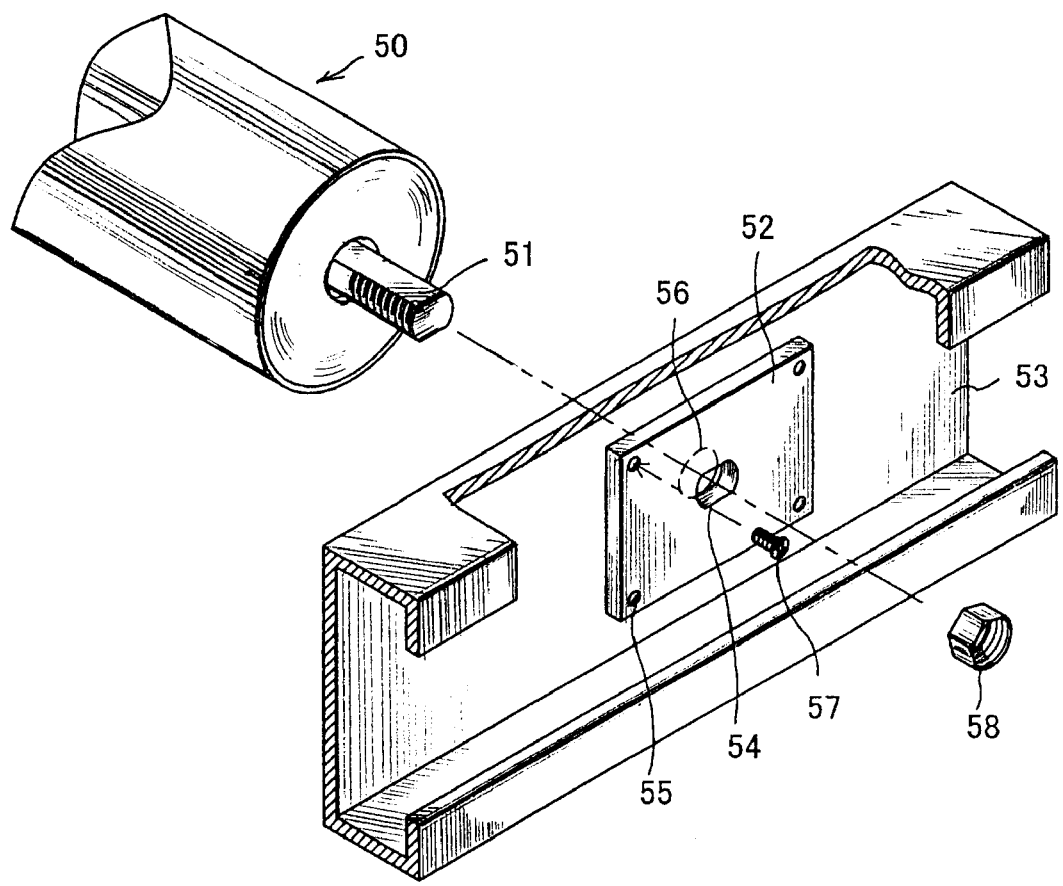
FIG. 10 is a view as in FIG. 1 of a conventional shaft connection.

The invention is not limited by the shaft 6, 7 including the three portions, namely, the supporting portion 13, the engaging portion 14, and the threaded portion 16. The shaft 6, 7 may be made by scraping down a threaded shaft to form two parallel flat faces, like the shaft 51 of the prior art motorized roller 50 shown in FIG. 10.

The invention is not limited by the fact that the section of the engaging portion 14 of the shaft 6, 7 has the same shape as the throughhole 21 of the plate, either.

The fastener mounted on the shaft 6, 7 is not limited to a nut 22 or a bolt 25 shown in the above-mentioned embodiments. A fastener such as a retaining ring or a snap ring can be used to prevent axial movement of the shaft 6, 7 and to press or urge the plate 19 against the frame 17.

The invention is applicable to fastening of any shaft, not limited by the above-mentioned embodiments in which fastening of a shaft of a motorized roller or a free roller incorporating no driving source is illustrated.

The invention enables fastening of the plate to the fixed body dispensing with screws and the like, that is, without making threaded bores and the like, so that fastening and mounting of shafts and rollers is performed easily and quickly regardless of shape of the fixed body. As the shaft is not rotatable relative to the plate and the plate is fastened to the fixed body, the shaft is fastened to the fixed body so that it is unrotatable relatively to the body.

What is claimed is:

1. A mounting structure comprising a roller unit, a shaft, a plate, a fixed body, and a fastener for mounting the roller unit to the fixed body, wherein the plate is mountable on the shaft unrotatably relative to the shaft and having projections engageable with a surface of a fixed body, wherein the roller unit has a roller body mounted on the shaft rotatably relative to the shaft and driven by a motor housed in the roller body, wherein the fastener is mounted on the shaft so as to urge the projections against the surface to prevent rotation of the plate relative to the fixed body about the axis of the shaft.

2. The mounting structure according to claim 1, wherein the plate has a throughhole, wherein the shaft comprises an engaging portion and a supporting portion that is larger than the engaging portion in diameter, wherein the engaging portion is fittable into the throughhole so as to prevent rotation of the plate relative to the shaft.

3. The mounting structure according to claim 1, wherein the plate is sandwiched between the fastener and the fixed body.

4. The mounting structure according to claim 1, wherein the plate is substantially rectangular with the projections at its four corners and with a throughhole at substantially its center.

5. The mounting structure according to claim 1, wherein each of the projections has a sharp tip.

6. The mounting structure according to claim 1, wherein the plate has a noncircular throughhole, wherein the shaft has a portion that is noncircular in section and capable of being inscribed in the throughhole, wherein the portion extends over at least partial length of the shaft, and wherein the portion is fittable into the throughhole.

* * * * *